July 10, 1956 P. H. PLANETA 2,754,024
NESTABLE WIRE BASKET
Filed Aug. 5, 1952 2 Sheets-Sheet 1

INVENTOR.
PAUL H. PLANETA
BY
*Louis V. Lucia*
ATTORNEY

July 10, 1956  P. H. PLANETA  2,754,024
NESTABLE WIRE BASKET
Filed Aug. 5, 1952  2 Sheets-Sheet 2
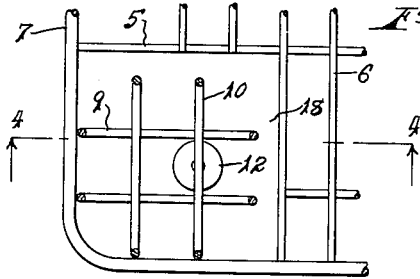
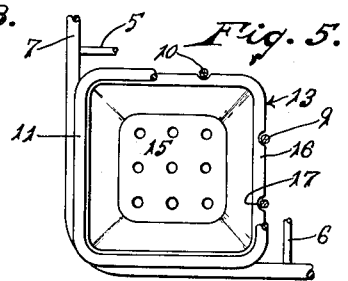
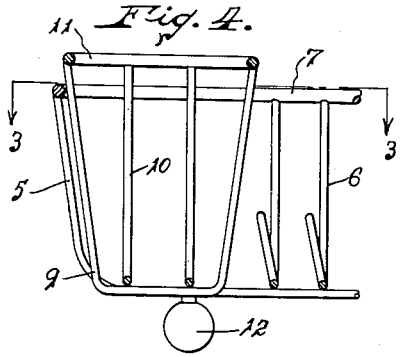
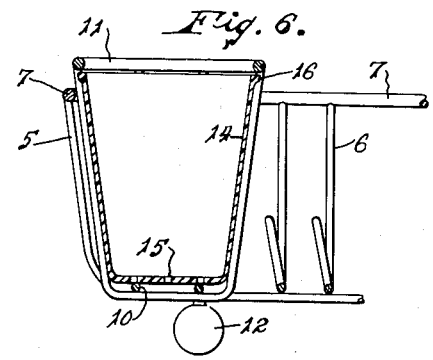
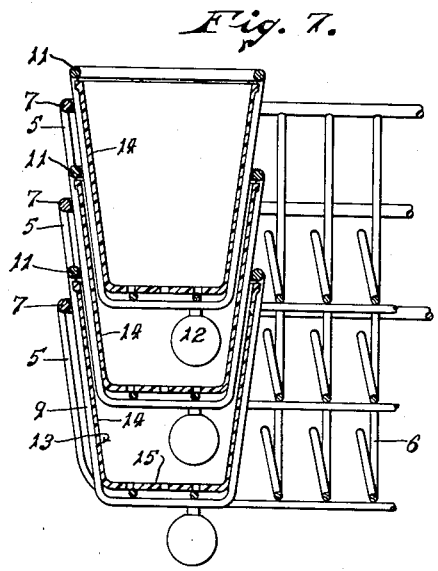
INVENTOR.
PAUL H. PLANETA
BY
Louis V. Lucia
ATTORNEY United States Patent Office 2,754,024
Patented July 10, 1956

2,754,024
NESTABLE WIRE BASKET

Paul H. Planeta, East Hampton, Conn.; The Connecticut Bank & Trust Co., Hartford, Conn., executor of said Paul H. Planeta, deceased, assignor to Artistic Wire Products Company, Incorporated, East Hampton, Conn., a corporation of Connecticut Application August 5, 1952, Serial No. 302,715

2 Claims. (Cl. 220—19)

This invention relates to nestable racks or baskets and more particularly to a nestable wire basket which is adapted to hold dishes and silverware or the like.

An object of this invention is to provide such a rack having a separate container therein for silverware and which is so constructed that the entire rack may be nested within an identical rack in order to conserve space.

A further object of this invention is to provide a wire rack having therein an integral basket providing a separate compartment, for containing articles such as silverware, and which is so constructed that a plurality of identical racks may be nested together without requiring that the baskets be removed therefrom.

A still further object is to provide such a rack in which the basket is provided with a liner in the form of a container and which can be nested with identical racks in such a manner as to accommodate the liners in their normal positions within the baskets and thereby alleviate the necessity of having to remove the said liners to permit the nesting of the racks.

Further objects and advantages of the present invention will be more clearly understood from the following description and from the accompanying drawings in which:

Fig. 3 is a sectional top view of a corner portion of the rack, on line 3—3 of Fig. 4.

Fig. 4 is a sectional side view thereof on line 4—4 of Fig. 3.

Fig. 5 is a plan view of the said corner portion, partly in section.

Fig. 6 is a sectional side view similar to Fig. 4 but showing a liner member in use.

Fig. 7 is a similar view showing a plurality of the trays nested together.

Figure 1:
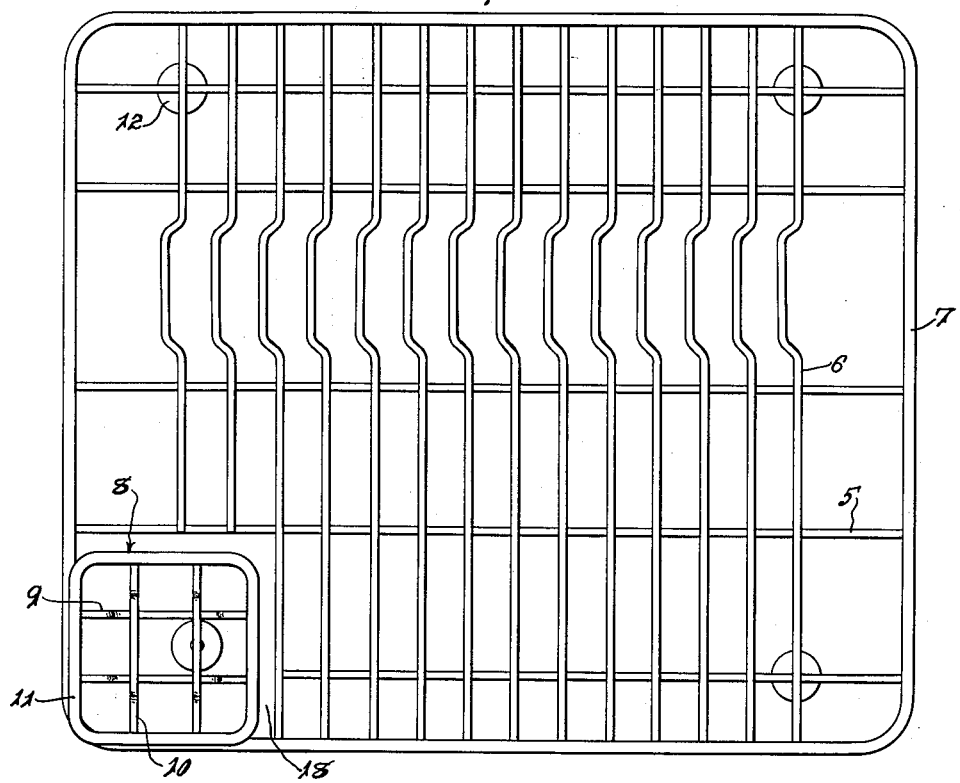
Fig. 1 is a plan view of a rack embodying my invention.
Figure 2:
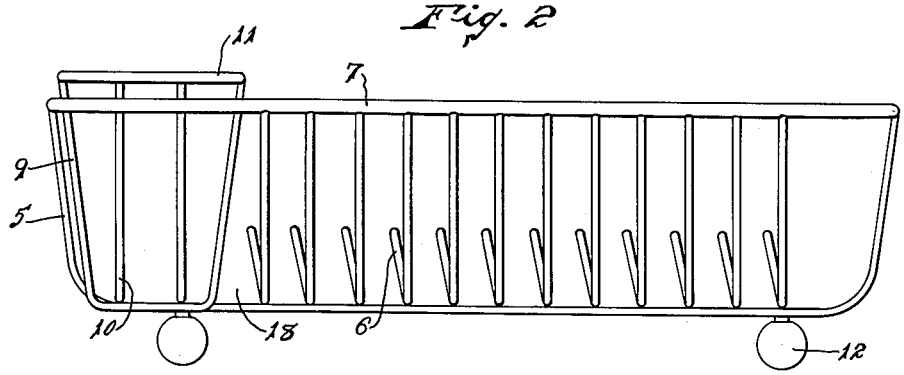
Fig. 2 is a side view thereof.

In the embodiment of the invention illustrated in the drawings, my improved rack comprises a basket-like wire structure having a bottom which is conventionally constructed of a series of crossed parallel wires 5 and 6, the end portions of which are bent upwardly to provide end walls and sidewalls, and a surrounding rim wire 7 is secured to the ends of the said wires.

My present invention is directed particularly to the provision of a nestable wire rack which includes a basket, such as indicated at 8, as a part thereof for holding such articles as silverware and the like. The said basket is preferably constructed of U-shaped wires 9 and 10, which are secured together to form the bottom and side walls of the basket, and a surrounding rim 11 is secured to the top ends of the said wires 9 and 10 to provide a rim for the basket.

The said basket is secured by two sides thereof upon the rim wire 7 of the rack, as clearly shown in Fig. 3, and the rim 11 of said basket is disposed above the rim 7 to provide a basket which is deeper than the rack so as to support such articles as forks, knives and the like, in a vertical position within the basket.

My improved rack is provided adjacent each corner thereof with a suitable foot 12; one foot being secured to the bottom of the basket as illustrated.

As shown in Figs. 5, 6 and 7, the basket 8 is preferably provided with a liner cup 13, which is constructed of a plastic material and has thin side walls 14, a perforated bottom 15, and a surrounding flange 16 which provides a rim for said cup. The said flange is notched, as at 17, to receive the wires 9 and 10 and thereby permit the said liner cup to rest parallel to and against the side walls of the basket. It will be noted that the rim wire 11 of the basket is substantially thicker than the side wires 9 and 10 and thereby overhangs the inner sides of the said side wires and provides a space to accommodate the thickness of the side walls of the liner when the racks are in nested position. Also, the flange 16 of the liner cup is disposed under the rim 11 and thereby provides for retaining the liner within the basket and preventing accidental displacement of the said cup.

It will be also noted that the side and end walls of the rack are slanted downwardly and inwardly and that the side walls of the basket which are formed by the wires 9 and 10 are also likewise slanted and are parallel to the walls of the rack so as to permit identical racks to be closely nested. The bottom and side walls of the rack are cut away at the corner where the basket is secured thereto so as to provide a clearance space 18 around the basket and thereby permit the nesting of the baskets of identical racks when the racks are nested together.

As clearly illustrated in Figure 7, when the said racks are placed in nested position, the rim 7 of the lower rack will be engaged by the side and end walls of the next rack and the rim 11 of the bottom basket will engage the walls of the next basket. The liners of each rack will be contained between the inner sides of the side walls of its respective basket and the outer sides of the side wall of the next basket as sufficient space is allowed between two adjacent nested baskets by the overhanging rim 11 to permit said liners to be loosely contained between the adjacent baskets so as to not become distorted.

It will also be noted from the illustration of Figure 7 that, when the racks are nested, there is sufficient room provided between the bottoms of the adjacent baskets to accommodate the feet 12 without contacting the bottoms of the liner cups and the racks are supported in nested position entirely by contact between the sidewalls and the rims of the adjacent racks and their baskets.

It is also to be noted that the nesting of the identical racks in the manner above described is permitted entirely by the fact that the bottom and side walls of the rack are cut out adjacent the basket to provide the space 18, so that the rim of the basket of one tray may be entered through the said space to pass the bottom of the next tray and reach its nested position with relation to the basket therein. The said space also permits the racks to be readily unnested by simply separating them and passing the rims 11 downwardly through the spaces 18.

I claim:

1. A dish and silverware drain comprising a wire basket formed of spaced interconnected longitudinal and transverse wires forming an open work bottom, the ends of the wires being bent upwardly and inclined outwardly to form side walls, a wire rim extending around and secured to the upper extremities of the wires, the outermost longitudinal wire at one end of the basket having one of its ends terminating short of the adjacent side wall of the basket, the ends of certain of the transverse wires at one end of the basket terminating short of the adjacent side wall of the basket and thereby forming an opening in one corner of the bottom of the basket, and an upwardly flaring wire silverware receptacle secured only at its upper portion to the rim and depending downwardly entirely within the confines of the opening and in spaced relation thereto in the aforesaid corner of the basket.

2. A drain rack comprising a wire basket formed of spaced interconnected longitudinal and transverse wires forming an open bottom, the ends of the wires being bent upwardly and inclined outwardly to form side walls, a wire rim extending around and secured to the upper extremities of the wires, a portion of certain of the longitudinal wires adjacent a side wall of the basket being omitted wherein said last named wires terminate along a portion of a transverse wire, a corresponding portion of certain of the transverse wires adjacent said side wall being omitted wherein said last named wires terminate along a portion of a longitudinal wire, the said omitted portions resulting in an opening in the bottom and side walls of said basket defined by said wire rim and said portions of said longitudinal and transverse wires, and an upwardly flaring wire silverware receptacle secured only at its upper portion to the rim and depending downwardly entirely within the confines of the opening and in spaced relation thereto.

References Cited in the file of this patent

UNITED STATES PATENTS

| | | |
|---|---|---|
| 646,128 | Price | Mar. 27, 1900 |
| 1,426,931 | Walker | Aug. 22, 1922 |
| 2,163,865 | Bitney | June 27, 1939 |
| 2,257,192 | Romney | Sept. 30, 1941 |